United States Patent [19]

Borman

[11] 4,184,033
[45] Jan. 15, 1980

[54] MELT POLYMERIZATION PROCESS FOR INCREASING THE MOLECULAR WEIGHT OF POLY(1,4-BUTYLENE TEREPHTHALATE)

[75] Inventor: Willem F. H. Borman, Evansville, Ind.

[73] Assignee: General Electric Company, Pittsfield, Mass.

[21] Appl. No.: 574,330

[22] Filed: May 5, 1975

[51] Int. Cl.$^2$ .................... C08G 63/22; C08G 63/18
[52] U.S. Cl. .................... 528/309; 525/243; 526/71; 528/307
[58] Field of Search .................... 260/75 M, 75 T

[56] References Cited

U.S. PATENT DOCUMENTS

| | | | |
|---|---|---|---|
| 3,453,240 | 7/1969 | Plaster et al. | 260/75 M |
| 3,592,876 | 7/1971 | Brinkmann et al. | 260/75 T |
| 3,635,899 | 1/1972 | Doerr et al. | 260/75 M |
| 3,787,370 | 1/1974 | Shima et al. | 260/75 M |
| 3,803,099 | 4/1974 | Okuzumi | 260/75 M |
| 3,817,935 | 6/1974 | Beer | 260/75 R |

OTHER PUBLICATIONS

Chemical Week, Mar. 13, 1974, pp. 34-35.

*Primary Examiner*—Walter C. Danison
*Attorney, Agent, or Firm*—Morgan, Finnegan, Pine, Foley & Lee

[57] ABSTRACT

A novel melt polymerization process is disclosed for increasing the molecular weight of poly(1,4-butylene terephthalate). This process comprises adding a compound containing at least two aliphatic or cycloaliphatic hydroxyl groups to a low molecular weight poly(1,4-butylene terephthalate) and thereafter melting the polymer in a vacuum until the desired molecular weight is reached.

9 Claims, No Drawings

MELT POLYMERIZATION PROCESS FOR INCREASING THE MOLECULAR WEIGHT OF POLY(1,4-BUTYLENE TEREPHTHALATE)

This invention relates to a melt polymerization process for increasing the molecular weight of a low molecular weight poly(1,4-butylene terephthalate). The process is based on combining a compound containing at least two aliphatic or cycloaliphatic hydroxyl groups with a low molecular weight poly(1,4-butylene terephthalate) and melting the polymer in a vacuum until the desired molecular weight is reached.

BACKGROUND OF THE INVENTION

Poly(1,4-bitylene terephthalate) is a known linear polyester molding resin that -butylene useful for many diverse applications. This material is described in Whinfield. U.S. Pat. No. 2,465,319 and Pengilly, U.S. Pat. No. 3,047,539 which are hereby incorporated by reference.

Poly(1,4-butylene terephthalate) is commercially prepared by reaction of a dialkylterephthalate or terephthalic acid with 1,4-butanediol at elevated temperature and reduced pressure.

The apparatus employed in preparing poly(1,4-butylene terephthalate) is subject to unexpected mechanical failure that results in holding partially polymerized, in process polymer, above its melt temperature until the mechanical difficulty has been overcome. In some cases, the low molecular weight polymer must be removed prematurely from the system.

Poly(1,4-butylene terephthalate) has been found to be highly sensitive to interruption in the normal polymerization process. These interruptions result in a low molecular weight poly(1,4-butylene terephthalate) which has a tendency to undergo thermal degradation. The thermal degradation is evidenced by the sublimation of volatile materials from the melt. These volatiles tend to condense in the vacuum system and cause fouling of the equipment and eventually further interruptions in the polymerization process.

The thermal degradation of poly(1,4-butylene terephthalate) is believed to result in the splitting off of the hydroxyl terminal group ($-O-CH_2-CH_2-CH_2-CH_2-OH$) with the formation of a terminal carboxylic acid group and tetrahydrofuran. Other low molecular weight polyalkylene terephthalates do not exhibit this phenomenon as ethylene glycol and propylene glycol do not readily cyclize for steric reasons. When poly(1,4-butylene terephthalate) undergoes thermal degradation, an excess of carboxylic acid groups is rapidly formed. These carboxylic acid groups act as chain stoppers and prevent further build up of molecular weight upon resumption of the process.

It has now been found that the addition of a minor amount of a compound containing at least two aliphatic or cycloaliphatic hydroxyl groups prevents thermal degradation of the low molecular weight poly(1,4-butylene terephthalate) and permits it to be polymerized in the melt.

Accordingly, it is a primary object of this invention to provide a novel process for the melt polymerization of low molecular weight poly(1,4-butylene terephthalate) to high molecular weight poly(1,4-butylene terephthalate).

It is also an object of this invention to provide a method for preventing the thermal degradation of low molecular weight poly(1,4-butylene terephthalate).

DETAILED DESCRIPTION OF THE INVENTION

This invention provides a method for polymerizing low molecular weight poly(1,4-butylene terephthalate) to a higher molecular weight. The method comprises melt blending with the low molecular weight poly(1,4-butylene terephthalate), a minor amount of a compound containing at least two aliphatic or cycloaliphatic hydroxyl groups and thereafter heating the melt in a vacuum to form a high molecular weight poly(1,4-butylene terephthalate).

The particular compound that contains at least two aliphatic or cycloaliphatic hydroxyl groups may be an aliphatic diol having from 2 to 8 carbon atoms such as ethylene glycol; 1,2-propanediol; 1,3-propanediol; 1,3-butanediol; 1,4-butanediol; 1,5-pentanediol; 1,6-hexanediol; a trifunctional alcohol such as glycerol; trimethylol ethane; trimethylol propane; trimethylol cyclohexane; tris-hydroxy methylbenzene; 1,2,6-hexanetriol; tetrafunctional alcohols such as pentaerythritol; cycloaliphatic hydroxyl compounds such as cyclohexane dimethanol; very low molecular weight hydroxyl terminated prepolymer such as bis(4-hydroxy-n-butylterephthalate) and poly(1,4-butylene terephthalate) having ten units or less; or high molecular weight hydroxyl containing materials such as hydroxyl terminated polybutadiene.

If one desires to obtain a linear poly(1,4-butylene terephthalate), then a dihydric compound will be employed in the process of the invention. If a branched poly(1,4-butylene terephthalate) polymer is desired then a tri-, tetra- or other polyhydric hydroxyl compound will be employed.

It is contemplated that the process of the invention may be used in the further polymerization of low molecular weight poly(1,4-butylene terephthalate) that has an intrinsic viscosity between 0.3 dl/g and 1.05 dl/g in a 60:40 mixture of phenoltetrachloroethane at 30° C. The melt polymerization may be carried out at a temperature range of between 240° and 300° C.; or more preferably between 245° and 265° C. and at a vacuum between 5 and 0.05 mm Hg.

The process may be carried out until the poly(1,4-butylene terephthalate) reaches an intrinsic viscosity of between 1.10 dl/g and 1.6 dl/g as measured in a 60:40 mixture of phenoltetrachloroethane at 30° C. Generally from 0.1 to 5 parts by weight of the compound containing at least two aliphatic or cycloaliphatic hydroxyl groups per 100 parts by weight of polymer, will be employed.

The preferred additives for use in carrying out the invention are 1,4-butanediol or very low molecular weight poly(1,4-butylene terephthalate). These additives are preferred as they will yield products undistinguishable from poly(1,4-butylene terephthalate) prepared in an uninterrupted, single cycle process run.

DESCRIPTION OF THE PREFERRED EMBODIMENTS

Example 1

A sample of low molecular weight poly(1,4-butylene terephthalate) having an intrinsic viscosity of about 1.03 dl/g in a 60:40 mixture of phenol-tetrachloroethane at 30° C. and a carboxyl content of 36 meq./kg was obtained from a manufacturing run in which the cycle was interrupted prior to reaching an intrinsic viscosity that would be useful in preparing commercially acceptable materials. This sample was dried and 5% by weight of 1,4-butanediol was added. The mixture was melted for ½ hour in a nitrogen atmosphere with moderate stirring. The melt was then subjected to polymerization conditions of 256°-7° C./0.1 mm Hg for two hours resulting in a product having an intrinsic viscosity of 1.22 dl/g as measured in a 60:40 mixture of phenol and tetrachloroethane at 30° C. and a carboxyl content of 9 meq./kg.

A control experiment was carried out which employed the same low molecular weight polymer. A sample of the polymer was dried, melted under vacuum and heated with slow stirring at 256° C./0.1 mm for one hour. The intrinsic viscosity was determined, and it was found that it had decreased to 1.02 dl/g as measured in a 60:40 mixture of phenol and tetrachloroethane at 30° C. and a carboxyl content of 44 meq./kg. When the polymer was heated for two hours under similar conditions, the intrinsic viscosity was measured in a 60:40 mixture of phenol and tetrachloroethane decreased to 0.87 dl/g as measured in a 60:40 mixture of phenol and tetrachloroethane and the carboxyl content increased to 60 meq./kg. Also a sublimate was deposited at the top of the reactor.

Example 2

In another experiment, the same low molecular weight poly(1,4-butylene terephthalate) was melted with 0.5% by weight of pentaerythritol for one-half hour, followed by polymerization at 255°-7° c./0.1 mm Hg for 90 minutes. Further polymerization took place and the product gelled.

Example 3

This experiment was carried out in the same manner as Example 2 except that 0.1% by weight of pentaerythritol was employed. The resulting polymer had an intrinsic viscosity of 1.07 dl/g as measured in a 60:40 mixture of phenol and tetrachloroethane at 30° C.

Example 4

A sample of poly(1,4-butylene terephthalate) was withdrawn from a polymerization reactor before it was fully polymerized and the intrinsic viscosity was determined to be 0.73 dl/g in a 60:40 mixture of phenol and tetrachloroethane at 30° C. and the carboxyl content was determined to be 15 meq./kg. Upon further heating for one-half hour at 255°-256° C./0.15 mm Hg., its intrinsic viscosity increased to 1.19 gl/g and its carboxyl content to 30 meq./kg.

Another sample of the same prepolymer was melted with the addition of 2% by weight of 1,4-butanediol and polymerized for one-half hour to 255° C./0.15 mm Hg. The resulting product had an intrinsic viscosity of 1.46 dl/g as measured in a 60:40 mixture of phenol and tetrachloroethane at 30° C. and contained 5 meq./kg. of carboxyl groups.

Example 5

A sample of the prepolymer of Example 4 was melted with 10% by weight of a poly(1,4-butylene terephthalate) prepolymer that had an intrinsic viscosity of 0.15 dl/g as measured in a 60:40 mixture of phenol and tetrachloroethane at 30° C. Polymerization was carried out for 90 minutes at 255° C./0.1 mm Hg and the intrinsic viscosity reached 1.53 dl/g as measured in a 60:40 mixture of phenol and tetrachloroethane.

Other modifications and variations of the present invention are possible in the light of the above teachings. It is, therefore, to be understood that changes may be made in the particular embodiments of the invention described which are within the intended scope of the invention as defined by the appended claims.

I claim:

1. A method for polymerizing low molecular weight poly(1,4-butylene terephthalate) having an intrinsic viscosity of between 0.3 dl/g and 1.05 dl/g as measured in a 60:40 mixture of phenol/tetrachloroethane at 30° C. to a higher molecular weight, said method comprising melt blending with said low molecular weight poly(1,4-butylene terephthalate) from 0.1 to 5.0 parts by weight per hundred parts by weight of said low molecular weight poly(1,4-butylene terephthalate) of a compound containing at least two aliphatic or cycloaliphatic hydroxyl groups to form a blend of said low molecular weight poly(1,4-butylene terephthalate) and said compound containing at least two aliphatic or cycloaliphatic hydroxyl groups and thereafter heating said blend in a vacuum to form a high molecular weight poly(1,4-butylene terephthalate).

2. A process as defined in claim 1 wherein the compound containing at least two aliphatic or cycloaliphatic hydroxyl groups is 1,4-butanediol.

3. A process as defined in claim 1 wherein the compound containing at least two aliphatic or cycloaliphatic hydroxyl groups is a poly(1,4-butylene terephthalate) having less than ten repeating units.

4. A process as defined in claim 1 wherein the compound containing at least two aliphatic or cycloaliphatic hydroxyl groups is pentaerythritol.

5. A process as defined in claim 1 wherein the melt polymerization is carried out at a temperature between 245° and 265° C.

6. A process as defined in claim 5 wherein the vacuum is between 5 and 0.05 mm Hg.

7. A process for preventing the thermal degradation of melted low molecular weight poly(1,4-butylene terephthalate) having an intrinsic viscosity of between 0.3 dl/g and 1.05 dl/g as measured in a 60:40 mixture of phenol/tetrachloroethane at 30° C. said process comprising adding from 0.1 to 5.0 parts by weight per hundred parts by weight of said low molecular weight poly(1,4-butylene terephthalate) of a compound containing at least two aliphatic or cycloaliphatic hydroxyl groups to the melt.

8. a method for polymerizing low molecular weight poly(1,4-butylene terephthalate) having an intrinsic viscosity of between 0.3 dl/g and 1.05 dl/g as measured in a 60:40 mixture of phenol/tetrachloroethane at 30° C. which comprises melt blending said poly(1,4-butylene terephthalate) with from 0.1 to 5.0 parts by weight per hundred parts by weight of said poly(1,4-butylene terephthalate) of a hydroxyl terminated poly(1,4-butylene terephthalate) having less than ten repeating units, thereafter heating said blend at a temperature of between 240°-300° C. and a vacuum between 0.05 and 5 mm Hg until said low molecular weight poly(1,4-butylene terephthalate) reaches an intrinsic viscosity of between 1.10 dl/g and 1.6 dl/g as measured in a 60:40 mixture of phenol/tetrachloroethane at 30° C.

9. A method for polymerizing low molecular weight poly(1,4-butylene terephthalate) having an intrinsic viscosity of between 0.3 dl/g and 1.05 dl/g as measured in a 60:40 mixture of phenol/tetrachloroethane at 30° C. to a higher molecular weight, said method comprising melt blending with said low molecular weight poly(1,4-butylene terephthalate) from 0.1 to 5.0 parts by weight per hundred parts by weight of said low molecular weight poly(1,4-butylene terephthalate) of a compound containing at least two aliphatic or cycloaliphatic hydroxyl groups, said compound being selected from the group consisting of aliphatic diols, trifunctional alcohols, tetrafunctional alcohols, cyclohexane dimethanol, low molecular weight hydroxyl terminated bis(4-hydroxy-n-butyl-terephthalate) or poly(1,4-butylene-terephthalate) having ten units or less, and a high molecular weight hydroxyl terminated polybutadiene, to form a blend of said low molecular weight poly(1,4-butylene terephthalate) and said hydroxyl group containing compound and thereafter heating said blend in a vacuum to form a high molecular weight poly(1,4-butylene terephthalate).

* * * * *

UNITED STATES PATENT AND TRADEMARK OFFICE
CERTIFICATE OF CORRECTION

PATENT NO. : 4,184,033
DATED : January 15, 1980
INVENTOR(S) : Willem F.H. Borman It is certified that error appears in the above-identified patent and that said Letters Patent are hereby corrected as shown below:

In Col. 1, line 16, "Poly(1,4-bitylene terephthalate)" should read -- Poly(1,4-butylene terephthalate) --; on line 17, delete "-butylene" and insert -- is --.

Signed and Sealed this

Ninth Day of December 1980

[SEAL]

Attest:

SIDNEY A. DIAMOND

Attesting Officer

Commissioner of Patents and Trademarks